Patented Dec. 4, 1951

2,577,130

UNITED STATES PATENT OFFICE 2,577,130

PRODUCTION OF POTASSIUM TITANIUM FLUORIDE

Henry C. Kawecki, Fleetwood, Pa., assignor to Kawecki Chemical Company, Boyertown, Pa., a corporation of Pennsylvania No Drawing. Application December 23, 1950, Serial No. 202,579

10 Claims. (Cl. 23—88)

This invention relates to the production of potassium titanium fluoride and resides in a novel method of producing potassium titanium fluoride products.

In my United States Patent No. 2,475,287, there is described and claimed a method of producing potassium titanium fluoride (also known as potassium fluotitanate) by conversion of the titanium content of a titaniferous ore into titanium tetrafluoride and by subsequent conversion of this salt into potassium titanium fluoride by the addition thereto of an ionizable fluorine compound in the presence of potassium chloride. Although the process of this patent is characterized by the use of relatively inexpensive reagents, a substantial portion of the cost of producing the potassium titanium fluoride by this method is contributed by the necessity of separating intermediate reaction products and of evaporating and handling rather aqueous masses of substantial volume.

I have now found that a potassium titanium fluoride product can be produced by a dry method in which there is no problem of removing intermediate or final by-products. This method involves merely the heating of an intimate mixture of ammonium bifluoride, titanium dioxide and either potassium carbonate or potassium fluoride at any temperature above about 200° C. with the resulting production of a potassium titanium fluoride product. The by-products of the reaction, ammonia, water and carbon dioxide or hydrogen fluoride, are volatile at such reaction temperatures and are readily evolved to the ambient atmosphere. Accordingly, it will be seen that the method of producing a potassium titanium fluoride product pursuant to the present invention comprises forming an intimate mixture composed essentially of ammonium bifluoride, titanium dioxide and either potassium carbonate or potassium fluoride in proportions substantially those required stoichiometrically to provide the potassium, titanium and fluorine components of said product, and heating the mixture to a temperature of at least about 200° C.

The reagents required for practicing the method of my invention comprise ammonium bifluoride, titanium dioxide and either potassium carbonate or potassium fluoride, or possibly both. Ammonium bifluoride ($NH_4F \cdot HF$), also referred to as ammonium acid fluoride ($NH_4HF_2$), is readily available on the market in ample volume and modest cost. The titanium dioxide may be used in the form of native or mineral rutile or as commercial titanium dioxide pigment. Native rutile reacts satisfactorily with the other reagents, although its use imparts an off-color appearance to the final product and introduces as impurities those other metal components originally present in the mineral. For this reason, I prefer to use pigment titanium dioxide, such material being of high purity and yielding a product of good color. The grade of the pigment titanium dioxide is of no importance, any commercial titanium dioxide product being suitable for practicing the invention. Potassium carbonate and potassium fluoride are also available in commercial quantities, the product of commercial purity being wholly satisfactory for use in practicing the invention.

The aforementioned reagents appear to produce, in all instances which I have investigated, a potassium titanium fluoride product in which the potassium, titanium and fluorine are present in virtually the same proportions as those in which they are present in the unreacted mixture. This characteristic of the method of my present invention is of considerable importance because it makes possible the production of a potassium titanium fluoride product having substantially any desired potassium-to-titanium ratio. The significance of this characteristic becomes apparent upon considering the principal present use of potassium titanium fluoride products. These products are added to a bath of molten aluminum prior to casting for the purpose of introducing titanium into the aluminum where it functions as a grain refining agent. The titanium goes into the aluminum in a replacement-type reaction whereby the titanium component of the potassium titanium fluoride is replaced by aluminum from the bath of molten metal. The mechanics of removing the resulting potassium aluminum fluoride from the aluminum bath are such as to favor the formation of a potassium aluminum fluoride having the lowest possible melting point. Such a product is one containing aluminum in a proportion corresponding to a potassium titanium fluoride product in which the titanium comprises about 22% by weight. This is somewhat more titanium than that contained in the normal potassium titanium fluoride ($K_2TiF_6$) wherein the titanium is present in amount of 20.0% by weight. It will be seen, accordingly, that a potassium titanium fluoride product containing say 22% by weight of titanium can readily be produced by so proportioning the ammonium bifluoride, titanium dioxide and either potassium carbonate or potassium fluoride as to provide stoichiometric quantities of potassium, titanium and fluorine for the formation of this product. In the same manner, the normal potassium titanium fluoride product, conforming to the formula $K_2TiF_6$, can be produced by reacting stoichiometric quantities of the reagents, such stoichiometric quantities corresponding to three mols of ammonium bifluoride, one mol of titanium dioxide and one mol of potassium carbonate when this potassium salt is used or two mols of ammonium bifluoride, one mol of titanium dioxide and two mols of potassium fluoride when the latter potassium salt is used.

The thoroughness of reaction of the aforementioned components is enhanced by insuring their intimate admixture. For this purpose, I have found it advantageous to ball mill a mixture of the reagents, although simple but thorough admixture of the reagents in a rotating drum or the like will produce satisfactory results.

The reaction between the aforementioned reagents takes place at temperatures of about 200° C. and higher. The choice of reaction temperature involves merely the balancing of availability of heating equipment with the time available for effecting the reaction. Thus, I have found that a reaction temperature of about 200° C. is the lowest temperature at which the reaction will proceed within a commercially feasible period of time. In practice, I have found it particularly advantageous to heat the reagents to a temperature within the range of about 350°–400° C., inasmuch as at this temperature the reagents will completely react within a period of about one-half hour when placed in the heating oven in the form of 50-pound lots spread in a shallow layer. Inasmuch as the resulting potassium titanium fluoride product is relatively stable, the product showing no appreciable decomposition when fused at a temperature of about 700° C., the only upper limit to the heating range is that imparted by the tendency of ammonium bifluoride to sublime and thus be lost to the reaction mass.

The reaction mass itself need have no special form except that dictated by facility of effecting uniform heating. For this purpose, I have found it to be particularly satisfactory to carry out the heating operation in the form of shallow trays supported on racks in a heating oven. The reaction mass may also be heated uniformly to reaction temperature in a rotating kiln or other apparatus wherein a voluminous mass is agitated or otherwise handled so as to insure uniform exposure of the reaction mass to the heating medium.

The products of the reaction comprise, as pointed out hereinbefore, the desired potassium titanium fluoride product, ammonia, water and either carbon dioxide (when potassium carbonate is used) or hydrogen fluoride (when potassium fluoride is used). The potassium titanium fluoride is the sole residual solid product of the reaction. This product, because of the volatility of the other by-products, is ready for use without further purification. The solid product of the reaction, preferably after being ground to a suitable granular form, is therefore immediately marketable without further treatment. The volatile by-products of the reaction, ammonia, carbon dioxide, hydrogen fluoride and water, can be vented simply to the outside atmosphere although, if desired, these gaseous reaction products may be subjected to a scrubbing operation in order to remove and recover valuable components therefrom.

It will be appreciated, accordingly, that the method of my present invention offers an exceptionally flexible, simple and economical procedure for the production of potassium titanium fluoride from readily available and relatively inexpensive source materials. The flexibility of the method is apparent from the fact that the potassium titanium fluoride product so obtained may be made to have virtually any desired titanium content to suit the dictates of its ultimate use, whereas the simplicity and economy of the method are evidenced by the fact that no special handling technique is involved and no time- and labor-consuming operations are necessary for the separation of any by-products of the reaction. Inasmuch as ammonium bifluoride, titanium dioxide, potassium carbonate and potassium fluoride are readily available in commercial quantities while containing only negligible quantities of impurities which are not volatile at temperatures above 200° C., it will be further apparent that the potassium titanium fluoride products obtained by the practice of my invention are characterized by a similar high degree of purity.

I claim:

1. The method of producing a potassium titanium fluoride product which comprises forming an intimate mixture composed essentially of ammonium bifluoride, titanium dioxide and a potassium salt of the group consisting of potassium carbonate and potassium fluoride in proportions substantially those required stoichiometrically to provide the potassium, titanium and fluorine components of said product, and heating the mixture to a temperature of at least about 200° C. with the resulting formation of a potassium titanium fluoride product.

2. The method of producing a potassium titanium fluoride product which comprises forming an intimate mixture composed essentially of ammonium bifluoride, potassium carbonate and titanium dioxide in proportions substantially those required stoichiometrically to provide the potassium, titanium and fluorine components of said product, and heating the mixture to a temperature of at least about 200° C. with the resulting formation of a potassium titanium fluoride product.

3. The method of producing a potassium titanium fluoride product which comprises forming an intimate mixture composed essentially of ammonium bifluoride, titanium dioxide and a potassium salt of the group consisting of potassium carbonate and potassium fluoride in proportions substantially those required stoichiometrically to provide the potassium, titanium and fluorine components of said product, and heating the mixture to a temperature of about 350°–400° C. with the resulting formation of a potassium titanium fluoride product.

4. The method of producing a potassium titanium fluoride product which comprises forming an intimate mixture composed essentially of ammonium bifluoride, potassium carbonate and titanium dioxide in proportions substantially those required stoichiometrically to provide the potassium, titanium and fluorine components of said product, and heating the mixture to a temperature of about 350°–400° C. with the resulting formation of a potassium titanium fluoride product.

5. The method of producing a potassium titanium fluoride product which comprises forming an intimate mixture composed essentially of ammonium bifluoride, titanium dioxide and a potassium salt of the group consisting of potassium carbonate and potassium fluoride in proportions substantially those required stoichiometrically to provide the potassium, titanium and fluorine components of said product in which the titanium is present in amount of about 22% by weight, and heating the mixture to a temperature of at least about 200° C. with the resulting formation of said potassium titanium fluoride product.

6. The method of producting a potassium titanium fluoride product which comprises forming an intimate mixture composed essentially of ammonium bifluoride, potassium carbonate and titanium dioxide in proportions substantially those required stoichiometrically to provide the potassium, titanium and fluorine components of said product in which the titanium is present in amount of about 22% by weight, and heating the mixture to a temperature of at least about 200° C. with the resulting formation of said potassium titanium fluoride product.

7. The method of producing a potassium titanium fluoride product which comprises forming an intimate mixture composed essentially of about three mols of ammonium bifluoride, one mol of titanium dioxide and one mol of potassium carbonate, and heating the mixture to a temperature of at least about 200° C. with the resulting formation of potassium titanium fluoride.

8. The method of producing a potassium titanium fluoride product which comprises forming an intimate mixture composed essentially of about three mols of ammonium bifluoride, one mol of titanium dioxide and one mol of potassium carbonate, and heating the mixture to a temperature of about 350°–400° C. with the resulting formation of potassium titanium fluoride.

9. The method of producing a potassium titanium fluoride product which comprises forming an intimate mixture composed essentially of about two mols of ammonium bifluoride, one mol of titanium dioxide and two mols of potassium fluoride, and heating the mixture to a temperature of at least about 200° C. with the resulting formation of potassium titanium fluoride.

10. The method of producing a potassium titanium fluoride product which comprises forming an intimate mixture composed essentially of about two mols of ammonium bifluoride, one mol of titanium dioxide and two mols of potassium fluoride, and heating the mixture to a temperature of about 350°–400° C. with the resulting formation of potassium titanium fluoride.

HENRY C. KAWECKI.

No references cited.